(12) United States Patent
Yokoyama et al.

(10) Patent No.: US 11,686,589 B2
(45) Date of Patent: Jun. 27, 2023

(54) CHARGING AMOUNT CALCULATION APPARATUS AND CHARGING SYSTEM

(71) Applicant: TOYOTA JIDOSHA KABUSHIKI KAISHA, Toyota (JP)

(72) Inventors: Daiki Yokoyama, Gotemba (JP); Yoshihiro Sakayanagi, Mishima (JP); Midori Sugiyama, Susono (JP); Tomohiro Kaneko, Mishima (JP); Hirotaka Saito, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/812,763

(22) Filed: Jul. 15, 2022

(65) Prior Publication Data

US 2023/0028323 A1    Jan. 26, 2023

(30) Foreign Application Priority Data

Jul. 20, 2021  (JP) ................................. 2021-119443

(51) Int. Cl.
*G01C 21/34* (2006.01)
*B60L 58/13* (2019.01)
*B60L 53/12* (2019.01)

(52) U.S. Cl.
CPC .......... *G01C 21/3469* (2013.01); *B60L 53/12* (2019.02); *B60L 58/13* (2019.02); *B60L 2200/18* (2013.01); *B60L 2200/36* (2013.01); *B60L 2240/26* (2013.01); *B60L 2240/662* (2013.01); *B60L 2240/68* (2013.01); *B60L 2260/52* (2013.01); *B60L 2260/54* (2013.01)

(58) Field of Classification Search
CPC ..... G01C 21/3469; B60L 53/12; B60L 58/13; B60L 2200/18; B60L 2200/36; B60L 2240/26; B60L 2240/662; B60L 2240/68; B60L 2260/52; B60L 2260/54
See application file for complete search history.

(56) References Cited

U.S. PATENT DOCUMENTS

| | | | |
|---|---|---|---|
| 9,056,556 B1 * | 6/2015 | Hyde .................. | B60L 58/20 |
| 2013/0214591 A1 * | 8/2013 | Miller ................. | B60L 53/126 |
| | | | 307/104 |
| 2017/0088000 A1 * | 3/2017 | Payne .................. | B60L 53/60 |
| 2017/0190256 A1 * | 7/2017 | McGrath et al. ...... | B60L 53/14 |

FOREIGN PATENT DOCUMENTS

| | | | | |
|---|---|---|---|---|
| CN | 103010040 A | * | 4/2013 | .......... B60L 15/2045 |
| CN | 104424396 B | * | 12/2017 | ............. B60L 58/12 |
| EP | 2012135 A1 | * | 1/2009 | ............ B60L 3/0046 |
| JP | 2016-140193 A | | 8/2016 | |
| WO | WO-2013055830 A1 | * | 4/2013 | .......... B60L 11/1809 |
| WO | WO-2015049969 A1 | * | 4/2015 | ............ B60L 11/182 |

\* cited by examiner

*Primary Examiner* — Hung Q Nguyen
(74) *Attorney, Agent, or Firm* — Finnegan, Henderson, Farabow, Garrett & Dunner, LLP

(57) ABSTRACT

A charging amount calculation apparatus calculates an amount of power consumption by a battery for running along a running route and a during-running charging amount received by a power reception apparatus from at least one second power feeding facility. The charging amount calculation apparatus calculates a pre-running charging amount based on the amount of power consumption and the during-running charging amount.

6 Claims, 12 Drawing Sheets

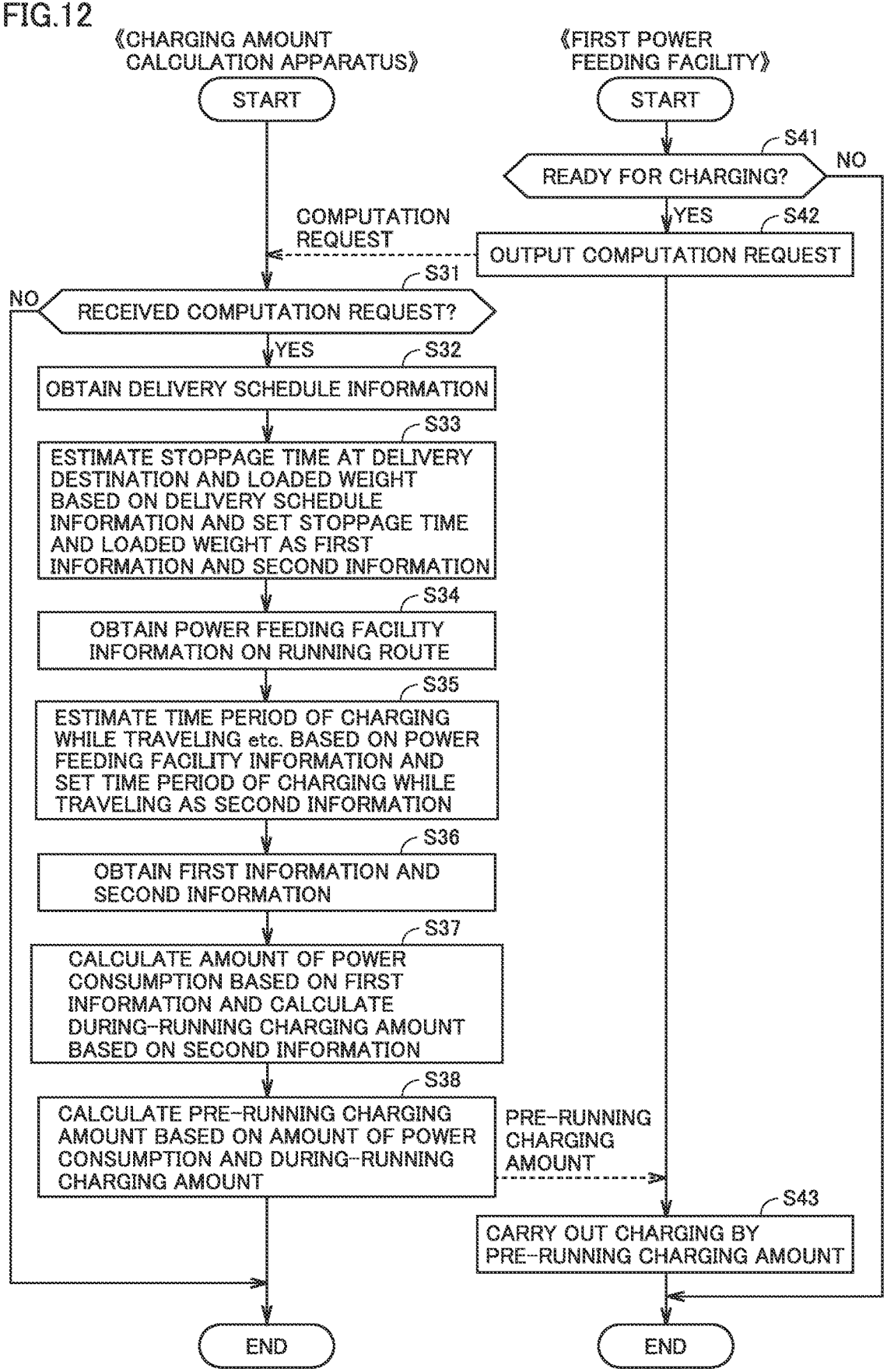

CHARGING AMOUNT CALCULATION APPARATUS AND CHARGING SYSTEM

This nonprovisional application is based on Japanese Patent Application No. 2021-119443 filed with the Japan Patent Office on Jul. 20, 2021, the entire contents of which are hereby incorporated by reference.

BACKGROUND

Field

The present disclosure relates to a charging amount calculation apparatus and a charging system that calculate a pre-running charging amount for charging of a vehicle before running along a running route.

Description of the Background Art

Japanese Patent Laying-Open No 2016-140193 discloses a vehicle in which a vehicle-mounted battery is chargeable by charging in accordance with a plurality of charging types (a plug-in charging type, a wireless charging type, and a solar charging type). This vehicle accepts input of set time and a set amount of charging from a user, determines a schedule for charging in accordance with the plurality of charging types such that an amount of charging of a battery attains to the set amount of charging at the set time, and gives the charging schedule as charging information.

SUMMARY

When a vehicle falls under a delivery vehicle that delivers a delivery item or a commercial vehicle such as a bus, the vehicle carries out contact charging at a specific location such as a business facility before running and thereafter runs in accordance with a determined running route. When contact power feeding facilities are insufficient at the business facility or the like, the vehicle cannot appropriately be charged before running and power may run out during running.

For example, when the vehicle can be charged during traveling owing to a power feeding lane on a running route or when the vehicle can be charged by a power feeding facility placed at a stop point (a delivery destination of the delivery vehicle or a bus stop), a charging time period before running can accordingly be reduced. In this case, a reduced charging time period can be allocated as a charging time period for another vehicle.

The present disclosure was made to solve the problem above, and an object of the present disclosure is to provide a charging amount calculation apparatus and a charging system that allow suitable charging of a vehicle before running along a running route.

A charging amount calculation apparatus according to one aspect of the present disclosure calculates a pre-running charging amount for charging of a vehicle before running along a running route. The charging amount calculation apparatus includes a processor and a memory in which a program executable by the processor is stored. The vehicle includes a power reception apparatus configured to receive electric power from a power feeding facility and a battery for traveling in which electric power received by the power reception apparatus is stored. The power feeding facility includes a first power feeding facility that charges the vehicle before running along the running route and at least one second power feeding facility that charges the vehicle during running along the running route. Each of the first power feeding facility and the at least one second power feeding facility is configured to transmit electric power through one of first power transmission in which electric power is transmitted through a charging cable and second power transmission in which electric power is wirelessly transmitted. The power reception apparatus is configured to receive electric power through at least one of the first power transmission and the second power transmission. The processor calculates an amount of power consumption by the battery for running along the running route and a during-running charging amount received by the power reception apparatus from the at least one second power feeding facility and calculates the pre-running charging amount based on the amount of power consumption and the during-running charging amount.

In the configuration, the amount of power consumption by the battery for running along the running route and the during-running charging amount received by the power reception apparatus from at least one second power feeding facility are calculated, and the pre-running charging amount is calculated based on the amount of power consumption and the during-running charging amount. Since charging can be carried out in consideration of the during-running charging amount and the amount of power consumption, charging more than necessary is not carried out. The vehicle can suitably be charged before running along the running route.

In one embodiment, the processor calculates the amount of power consumption based on first information and calculates the during-running charging amount based on second information. The at least one second power feeding facility is provided at at least one stop point on the running route. The first information includes a travel distance along the running route and a loaded weight of the vehicle. The second information includes a stoppage time of the vehicle at the at least one stop point. The loaded weight is varied by incoming and outgoing passengers in and out of the vehicle at at least one stop point or loading and unloading of a delivery item on the vehicle. The stoppage time is varied by the number of incoming and outgoing passengers at at least one stop point or the number of loaded and unloaded delivery items. According to the configuration, since pre-running charging is carried out in consideration of the travel distance and the loaded weight that affect the amount of power consumption and the stoppage time that affects the during-running charging amount, the vehicle can suitably be charged before running along the running route.

In one embodiment, the first information further includes at least one of an outdoor air temperature, time of day, a season, and congestion information during running along the running route and a precooling time period for cooling in advance of the inside of the vehicle before running. The vehicle can be charged during travel along the running route by the at least one second power feeding facility. The second information further includes a time period of charging while traveling. The time period of charging while traveling is a time period for charging of the vehicle during traveling along the running route by the at least one second power feeding facility. According to the configuration, since pre-running charging is carried out in consideration of the outdoor air temperature, time of day, the season, the congestion information, and the precooling time period that affect the amount of power consumption and the time period of charging while traveling that affects the during-running charging amount, the vehicle can suitably be charged before running along the running route.

In one embodiment, the vehicle is a bus that transports a passenger. The memory obtains information on the number of incoming and outgoing passengers from the vehicle, and the information is accumulated in the memory as historical data. The processor estimates the stoppage time and the loaded weight based on accumulated historical data in the past. According to the configuration, since the stoppage time and the loaded weight are estimated based on the historical data on the number of incoming and outgoing passengers, accuracy in estimation of the amount of power consumption can be enhanced.

In one embodiment, the vehicle is a delivery vehicle that delivers a delivery item. Delivery schedule information in which information on the delivery item delivered on the running route is recorded is stored in the memory. The processor estimates the stoppage time and the loaded weight based on the delivery schedule information. According to the configuration, since the stoppage time and the loaded weight are estimated based on the delivery schedule information, accuracy in estimation of the amount of power consumption can be enhanced.

A charging system according to another aspect of the present disclosure includes a charging amount calculation apparatus that calculates a pre-running charging amount for charging of a vehicle before running along a running route and a first power feeding facility that charges the vehicle before running along the running route. The vehicle includes a power reception apparatus configured to receive electric power from the first power feeding facility or at least one second power feeding facility for charging the vehicle during running along the running route and a battery for traveling in which electric power received by the power reception apparatus is stored. Each of the first power feeding facility and the at least one second power feeding facility is configured to transmit electric power through one of first power transmission in which electric power is transmitted through a charging cable and second power transmission in which electric power is wirelessly transmitted. The power reception apparatus is configured to receive electric power through at least one of the first power transmission and the second power transmission. The charging amount calculation apparatus calculates an amount of power consumption by the battery for running along the running route and a during-running charging amount received by the power reception apparatus from the at least one second power feeding facility, and calculates the pre-running charging amount based on the amount of power consumption and the during-running charging amount. The first power feeding facility charges the vehicle with electric power by the pre-running charging amount calculated by the charging amount calculation apparatus. According to the charging system as well, the vehicle can suitably be charged before running along the running route.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 12 is a flowchart showing a processing procedure in processing for charging the delivery vehicle according to the second embodiment.

DESCRIPTION OF THE PREFERRED EMBODIMENTS

Figure 1:
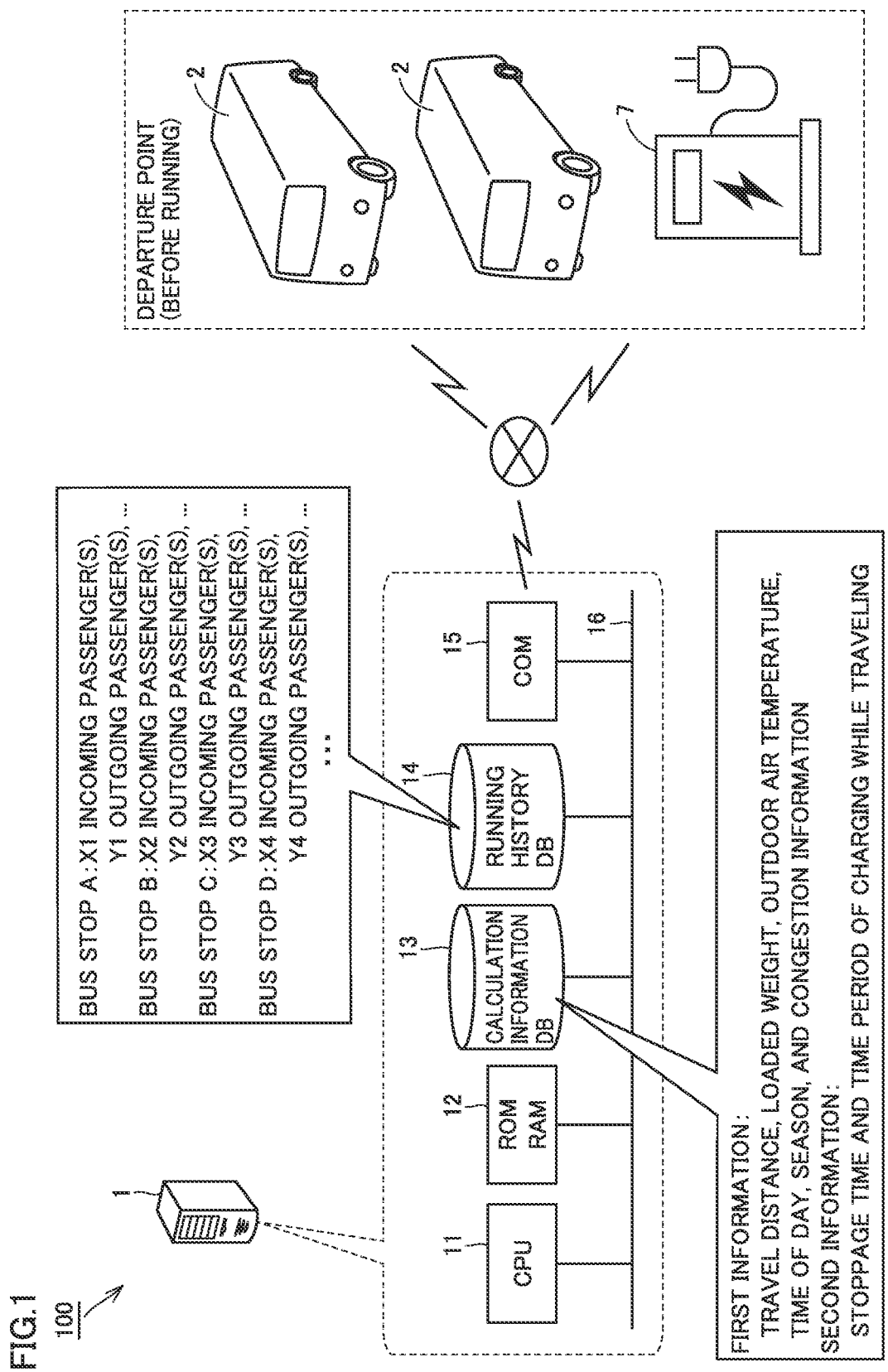
FIG. 1 is a diagram schematically showing an overall configuration of a bus charging system according to a first embodiment.

An embodiment of the present disclosure will be described in detail below with reference to the drawings. The same or corresponding elements in the drawings have the same reference characters allotted and description thereof will not be repeated.

First Embodiment

<System Configuration>

A first embodiment will initially be described. FIG. 1 is a diagram schematically showing an overall configuration of a charging system 100 that charges a bus 2 according to the first embodiment. Charging system 100 includes a charging amount calculation apparatus 1 and a power feeding facility 7 (which is also referred to as a "first power feeding facility 7"). First power feeding facility 7 charges a plurality of electric buses (which are simply denoted as a "bus" below) 2. Bus 2 is a vehicle that transports a passenger along a determined running route.

Charging amount calculation apparatus 1 is a server apparatus. Charging amount calculation apparatus 1 includes a processor 11, a memory 12, a calculation information database (DB) 13, a running history database (DB) 14, a communication module 15, and a data line 16.

Processor 11 is implemented, for example, by a central processing unit (CPU) and configured to perform prescribed computing processing described in a program.

Memory 12 includes a read only memory (ROM) and a random access memory (RAM). A program executed by processor 11 is stored in the ROM Data generated by execution of a program by processor 11 and data inputted through communication module 15 are temporarily stored in the RAM. The RAM functions also as a temporary data memory used as a work area.

Charging amount calculation apparatus 1 calculates a pre-running charging amount for charging of bus 2 before running along the running route. First power feeding facility 7 charges bus 2 with electric power by the pre-running charging amount calculated by charging amount calculation apparatus 1. Details will be described later with reference to FIG. 3 or a subsequent figure.

First information and second information are stored in calculation information database 13 as various types of information for calculating the pre-running charging amount. Though details will be described later, the first information includes a travel distance, a loaded weight, an outdoor air temperature, time of day, a season, and congestion information. The second information includes a stoppage time and a time period of charging while traveling.

Records of running of each of the plurality of buses 2 are stored in running history database 14. Data on the number of incoming and outgoing passengers that actually get on and off bus 2 in the past is stored in running history database 14. For example, in a certain run, such data that the number of incoming passengers and the number of outgoing passengers at a bus stop A where bus 2 stops are X1 and Y1, respectively, the number of incoming passengers and the number of outgoing passengers at a bus stop B are X2 and Y2, respectively, the number of incoming passengers and the number of outgoing passengers at a bus stop C are X3 and Y3, respectively, and the number of incoming passengers and the number of outgoing passengers at a bus stop D are X4 and Y4, respectively is stored together with a time stamp.

Communication module 15 includes a communication interface with a network such as the Internet. Communication module 15 is configured to bidirectionally communicate with a device (the plurality of buses 2, power feeding facility 7, and power feeding facilities 8 to 10 which will be described later) outside charging amount calculation apparatus 1.

Data line 16 is configured to exchange data among devices included in charging amount calculation apparatus 1.

In the present configuration, each bus 2 is configured to be capable of contact charging through a charging cable that extends from power feeding facility 7 or 10 and to be capable of wireless charging from power feeding facility 8 or 9. Contact type charging by power feeding facility 7 or 10 is also referred to as "contact charging" and wireless type charging by power feeding facility 8 or 9 is also referred to as "wireless charging." A further detailed configuration of bus 2 will be described with reference to FIG. 2.

<Contact and Wireless Electric Power Transmission>

Figure 2:
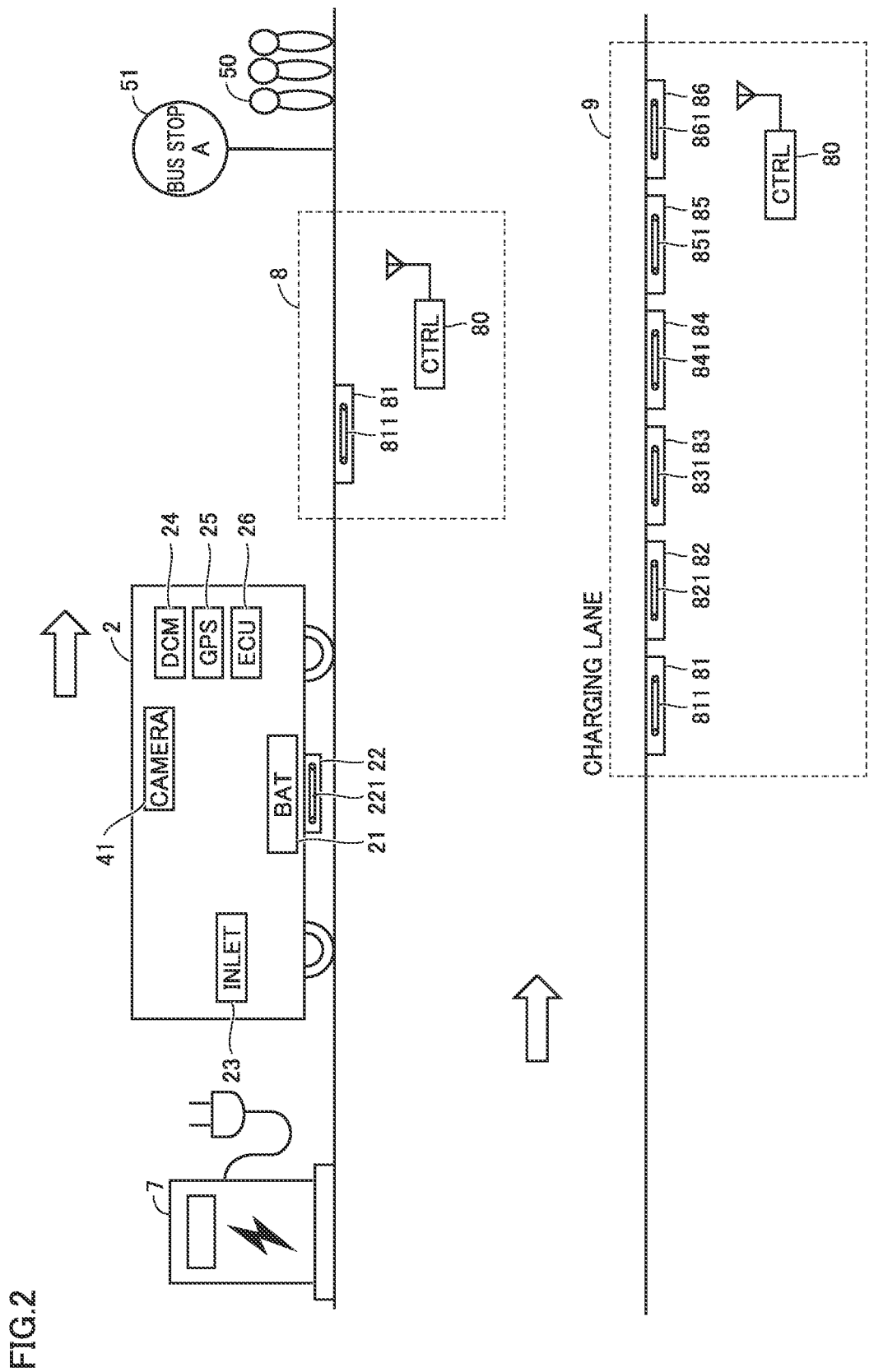
FIG. 2 is a diagram schematically showing an exemplary configuration of a bus and a power feeding facility according to the first embodiment.

FIG. 2 is a diagram schematically showing an exemplary configuration of bus 2 and power feeding facilities 7 to 9 according to the first embodiment. Bus 2 includes a battery 21, a power reception apparatus 22, an inlet 23, a data communication module (DCM) 24, a global positioning system (GPS) receiver 25, an electronic control unit (ECU) 26, and a camera 41.

Battery 21 is a battery assembly including a plurality of cells. Each cell is a secondary battery such as a lithium ion battery or a nickel metal hydride battery. Battery 21 supplies electric power for generating driving force of bus 2. Electric power generated by a motor generator (not shown) is stored in battery 21. Battery 21 is provided with a voltage sensor and a current sensor (neither of which is shown) for calculation of a state of charge (SOC) of battery 21 by ECU 26.

In an example shown in FIG. 2, power reception apparatus 22 is arranged on a lower surface of a floor panel that forms a bottom surface of bus 2. A power reception coil 221 is accommodated in power reception apparatus 22. Power reception coil 221 wirelessly receives electric power transmitted from power feeding facility 8.

Inlet 23 is constructed such that a charging connector of power feeding facility 7 (first power feeding facility 7) can be inserted therein by mechanical coupling such as fitting. As the charging connector is inserted, bus 2 and power feeding facility 7 are electrically connected to each other so that battery 21 can be charged with electric power supplied from power feeding facility 7.

Figure 3:
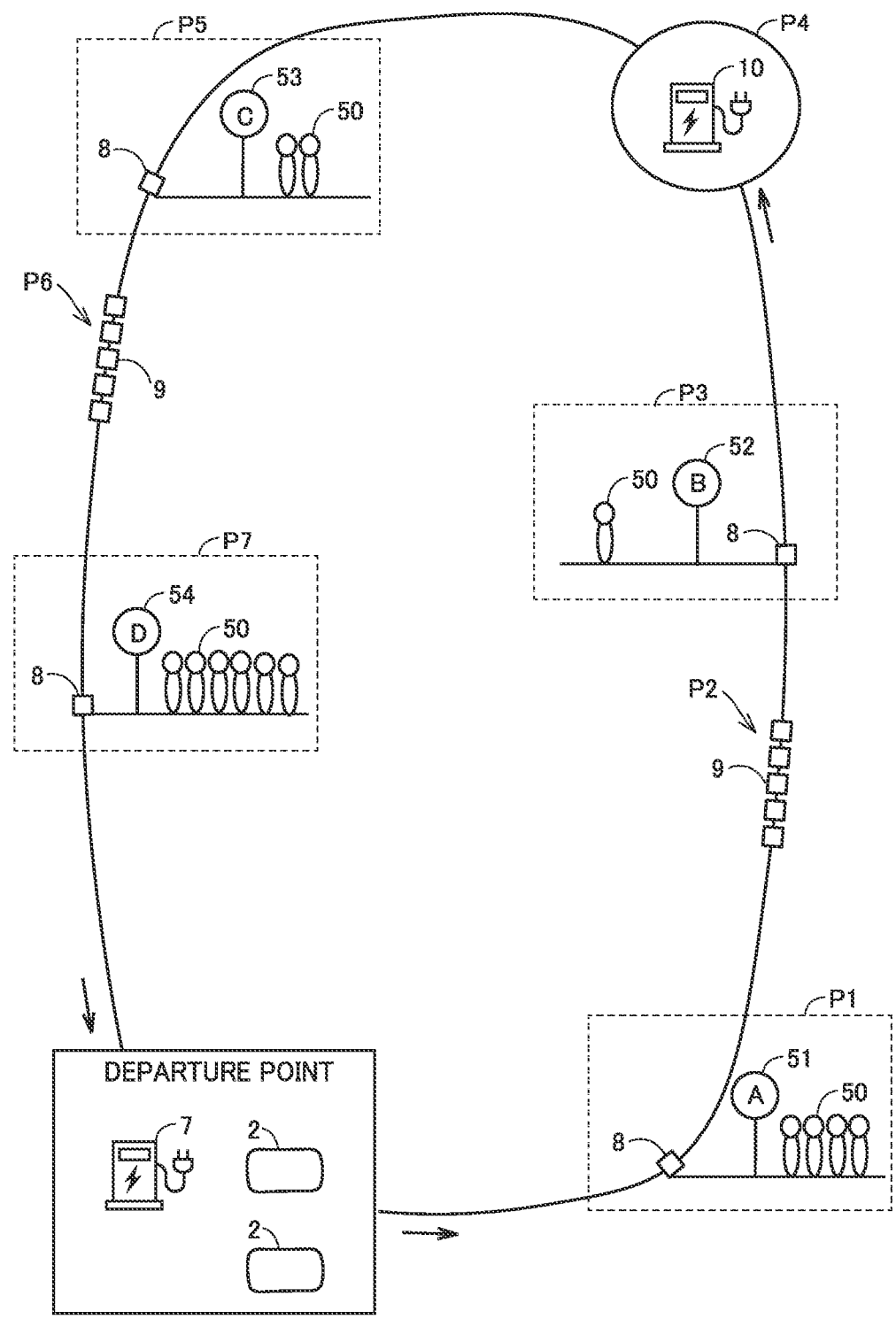
FIG. 3 is a diagram showing an exemplary running route of the bus according to the first embodiment.

Power feeding facility 10 which will be described later with reference to FIG. 3 is also identical in structure to power feeding facility 7. Battery 21 of bus 2 can be charged with electric power supplied by power feeding facility 10. Power feeding facilities 8 to 10 are also referred to as second power feeding facilities 8 to 10.

DCM 24 is configured such that bus 2 and charging amount calculation apparatus 1 can bidirectionally communicate with each other. DCM 24 is configured such that bus 2 and power feeding facilities 8 and 9 can bidirectionally communicate with each other.

GPS receiver 25 specifies a position of bus 2 based on radio waves transmitted from an artificial satellite (not shown). Charging amount calculation apparatus 1 obtains position information of each of the plurality of buses 2 through communication.

ECU 26 controls devices such that bus 2 is in a desired state, based on a program stored in a memory (not shown) and a signal from each sensor.

Power feeding facility 9 includes a plurality of power transmission units 81 to 86 and a controller 80. Though FIG. 2 shows an example in which six power transmission units are provided, the number of power transmission units is not particularly limited and a larger number of power transmission units may be provided.

The plurality of power transmission units 81 to 86 are arranged in line on a road surface (which may be a sidewall) of the running route of bus 2. The plurality of power transmission units 81 to 86 include power transmission coils 811 to 861, respectively. Power transmission coils 811 to 861 are electrically connected to an alternating-current (AC) power supply (not shown). Though not shown, each of the plurality of power transmission units 81 to 86 is provided with a sensor (an optical sensor, a weight sensor, or the like) that detects passage of bus 2.

Controller 80 specifies a position of traveling of bus 2 based on a detection signal from each sensor. Then, controller 80 has AC power from the AC power supply supplied to a power transmission coil in a power transmission unit above which bus 2 is located, among power transmission units 81 to 86.

Specifically, when ECU 26 of bus 2 carries out wireless charging while traveling (requests for charging from power feeding facility 9), ECU 26 transmits information on requested power to charging amount calculation apparatus 1 together with information on a vehicle ID. The information on requested power represents electric power that bus 2 desires to obtain from a charging lane (a power feeding lane). CPU 11 of charging amount calculation apparatus 1 obtains information on the vehicle ID and information on requested electric power from bus 2 through COM 15. CPU 11 of charging amount calculation apparatus 1 has the information on the vehicle ID and the information on requested power stored in a storage (not shown) in association with each other.

ECU 26 of bus 2 transmits the information on the vehicle ID through short-range communication. Controller 80 of power feeding facility 9 senses passage within a short time, of bus 2 over power transmission unit 81 (or power transmission units 82 to 86) by receiving information on the vehicle ID through short-range communication. When power feeding facility 9 receives information on the vehicle ID through short-range communication from bus 2, it transmits the vehicle ID to charging amount calculation apparatus 1. CPU 11 of charging amount calculation apparatus 1 reads information on requested power associated with the received vehicle ID from a storage device and sends the information on requested power to power feeding facility 9 together with information on the vehicle ID. Power feeding facility 9 is driven to supply electric power indicated in the information on requested power associated with the vehicle ID. Specifically, when power transmission unit 81 receives information on the vehicle ID from bus 2 through short-range communication, it receives supply of AC power from the AC power supply and forms electromagnetic field around power transmission coil 811. For example, power transmission unit 81 continues operations until lapse of a prescribed period of time since reception of information on the vehicle ID from bus 2 through short-range communication. When bus 2 passes over power transmission unit 81, electric power is wirelessly transmitted to power reception coil 221 of power reception apparatus 22 of bus 2. Power transmission unit 81 may switch between activation and deactivation in accordance with a control signal from charging amount calculation apparatus 1. In this case, for example, charging amount calculation apparatus 1 specifies power transmission unit 81 (to 86) over which bus 2 passes based on position information of bus 2, and outputs a control signal (an activation command) that activates power feeding facility 9. After bus 2 has passed over power transmission unit 81, charging amount calculation apparatus 1 may output a control signal (a deactivation command) that deactivates power transmission unit 81. This is also applicable to power transmission units 82 to 86 (and corresponding power transmission coils 821 to 861). As bus 2 travels over power transmission units 81 to 86, power transmission units 81, 82, 83, 84, 85, and 86 transmit electric power sequentially in this order. Alternatively, when charging amount calculation apparatus 1 senses entry of bus 2 into the power feeding lane including power transmission units 81 to 86, it may collectively activate power transmission units 81 to 86 included in the power feeding lane until bus passes over the power feeding lane. Battery 21 can thus be charged by travel by bus 2 over the power feeding lane.

Alternatively, information on requested electric power may be stored in power transmission units 81 to 86. For example, when CPU 11 of charging amount calculation apparatus 1 obtains information on the vehicle ID and information on requested power from bus 2 through COM 15, it transmits the information on the vehicle ID and the information on requested power to each of power transmission units 81 to 86 in association with each other. The information on the vehicle ID and the information on requested power are stored in each of power transmission units 81 to 86 in association with each other. Then, when power transmission units 81 to 86 receive the information on the vehicle ID from bus 2 through short-range communication, they receive supply of AC power from the AC power supply and form electromagnetic field around power transmission coils 811 to 861. For example, power transmission units 81 to 86 continue operating until lapse of a prescribed time period since reception of the information on the vehicle ID from bus 2 through short-range communication.

Power feeding facility 8 includes single power transmission unit 81 and controller 80. Power transmission unit 81 includes power transmission coil 811. Each power transmission coil 811 is electrically connected to an AC power supply (not shown). Though not shown, power transmission unit 81 is provided with a sensor (an optical sensor, a weight sensor, or the like) that detects presence of bus 2 above power transmission unit 81.

Controller 80 has AC power from the AC power supply supplied to power transmission coil 811 in power transmission unit 81 based on the detection signal from the sensor. Power transmission unit 81 is arranged at a position where it can supply electric power to bus 2 when bus 2 stops at a bus stop (in the present example, a bus stop A 51 where a passenger 50 waits).

Thus, electric power can be supplied to bus 2 while bus 2 stops at the bus stop. At that time, when the bus is crowded and there are a large number of incoming and outgoing passengers, it takes time for getting on and off the bus, and hence a time period for charging of bus 2 is longer. When there is time before departure time because of early arrival of bus 2, the charging time period is also accordingly longer.

Specifically, when ECU 26 of bus 2 carries out wireless charging while the bus remains stopped (when it requests for power feeding from power feeding facility 8), it has power reception coil 221 of power reception apparatus 22 and power transmission coil 811 of power feeding facility 8 aligned with each other while it communicates with power feeding facility 8 that carries out charging through short-range communication. When alignment is completed, ECU 26 of bus 2 transmits information on requested power to controller 80 of power feeding facility 8 through charging amount calculation apparatus 1. Alternatively, ECU 26 of bus 2 may directly transmit the information on requested power to power feeding facility 8 through short-range communication, without charging amount calculation apparatus 1 being interposed. Power feeding facility 8 is driven to supply electric power indicated in the information on requested power. Power feeding facility 8 continues operating until it receives a request for stop from charging amount calculation apparatus 1 or bus 2. When a quitting condition is satisfied, ECU 26 of bus 2 transmits a stop request to power feeding facility 8 through charging amount calculation apparatus 1 or directly without charging amount calculation apparatus 1 being interposed. For example, a condition that bus 2 has left the bus stop, a condition that the SOC of battery 21 has attained to an SOC set in advance, a condition that a time period set in advance has elapsed, and/or a condition that a user has performed a stop operation may be adopted as the quitting condition.

In the present embodiment, camera 41 is placed in bus 2. Camera 41 is placed at a door of bus 2 and shoots a passenger who gets on and off the bus. In the present embodiment, the number of boardings and dismounts (the number of incoming and outgoing passengers) at each bus stop can be calculated from an image shot by camera 41.

The calculated number of incoming and outgoing passengers is stored in running history database 14 described above, together with time of boarding and dismount. Bus 2 or charging amount calculation apparatus 1 may calculate the number of incoming and outgoing passengers. Bus 2 transmits the image shot by camera 41 or the number of incoming and outgoing passengers to charging amount calculation apparatus 1.

The number of incoming and outgoing passengers should only be calculated, for example, based on a difference between the image from camera 41 shot when there is no incoming passenger and outgoing passenger and the image from camera 41 while a passenger is getting on or off. The number of incoming and outgoing passengers is found by extracting an area of a person from a difference between the images and counting the number of areas of the person. Without being limited as such, the number of incoming and outgoing passengers may be calculated with any known method.

Without being limited to placement of camera 41 in bus 2, camera 41 may be placed at each bus stop to calculate the number of incoming and outgoing passengers. Without being limited to camera 41, the number of incoming and outgoing passengers may be calculated with the use of some apparatus. For example, for a bus on a reservation basis, the number of incoming and outgoing passengers can be calculated based on bus reservation information.

Thus, in the present embodiment, power feeding facilities 7 to 10 transmit electric power (carry out charging) through any of contact charging (power feeding facilities 7 and 10) in which electric power is transmitted through the charging cable and wireless charging (power feeding facilities 8 and 9) in which electric power is wirelessly transmitted. Inlet 23 and power reception apparatus 22 receive electric power through at least one of contact charging and wireless charging from power feeding facilities 7 to 10. Power feeding facilities 7 to 10 include power feeding facility 7 (first power feeding facility 7) for charging of the vehicle before running along the running route and at least one (seven in the present embodiment but may be one) power feeding facility 8 to 10 (second power feeding facility 8 to 10) for charging of bus 2 during running along the running route.

<Running Route>

FIG. 3 is a diagram showing an exemplary running route of bus 2 according to the first embodiment. There is at least one stop point on the running route. In the present embodiment, four bus stops A 51 to D 54 are defined as stop points. A single bus stop may be provided. In this example, such a running route that bus 2 leaves a departure point (a bus terminal or the like) and returns to the departure point via bus stops A 51 to D 54 is assumed. Stop points where power feeding facilities 8 to 10 are placed on the running route are shown with points P1 to P7.

When bus 2 starts running along the running route, initially, bus 2 heads for bus stop A 51 (point P1) where power feeding facility 8 is placed. Then, bus 2 heads for a bus stop B 52 (point P3) where power feeding facility 8 is placed. On this path, there is a charging lane (point P2) where power feeding facility 9 is placed, so that the bus can be charged during traveling over the charging lane.

After the bus leaves bus stop B 52 (point P3), before reaching a next bus stop C 53 (point P5), power feeding facility 10 (point P4) is placed. Bus 2 temporarily stops at point P4 for time adjustment. At that time, bus 2 can carry out contact charging using power feeding facility 10.

After the bus leaves bus stop C 53 (point P5), before reaching next bus stop D 54 (point P7), there is a charging lane (point P6) where power feeding facility 9 is placed, so that the bus can be charged during traveling over the charging lane. The bus leaves bus stop D 54 (point P7) and returns to the departure point.

Since bus 2 thus travels along the predetermined running route, it can be charged at points P1 to P7 placed on the running route.

Figure 4:
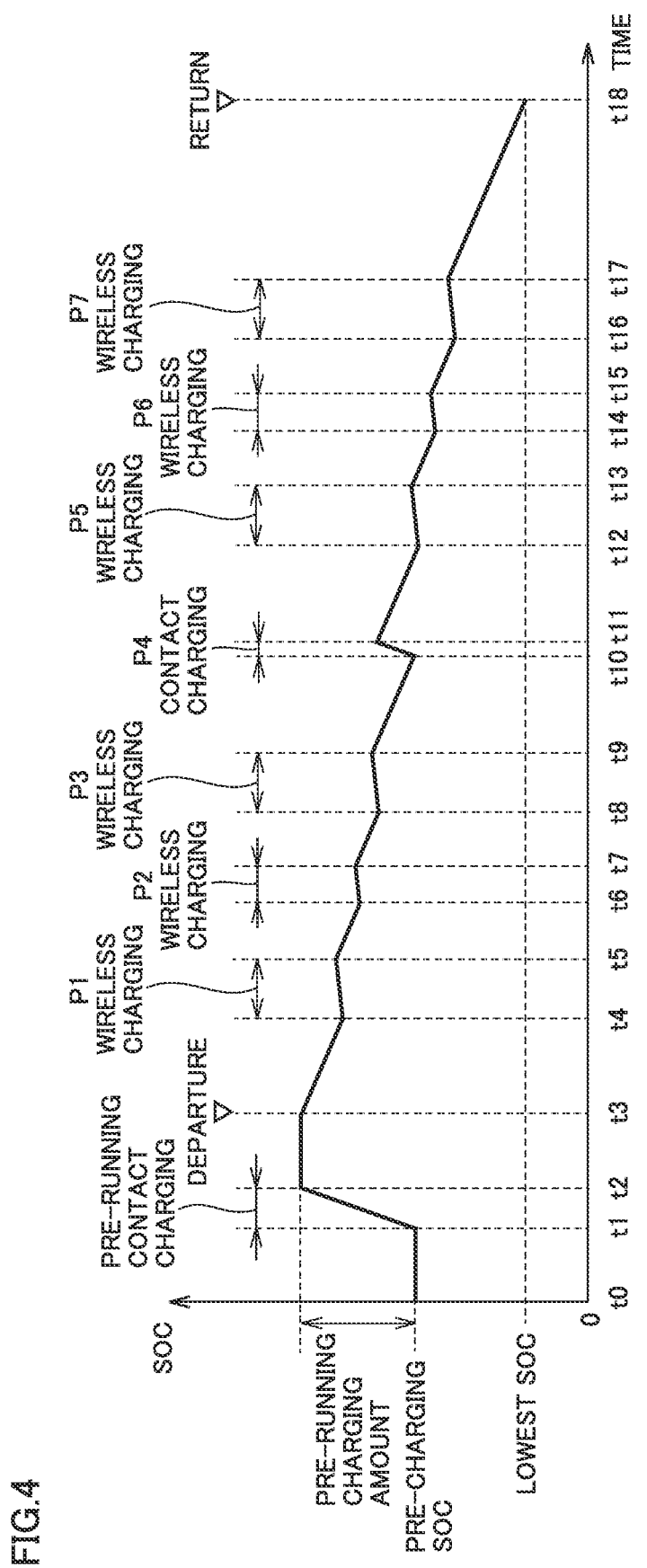
FIG. 4 is a diagram for illustrating transition of an amount of charging of the bus according to the first embodiment.

FIG. 4 is a diagram for illustrating transition of an amount of charging of bus 2 according to the first embodiment. The abscissa represents elapsed time and the ordinate represents an SOC of battery 21.

As described above, bus 2 can be charged at points P1 to P7 from departure from the departure point until return to the departure point. When bus 2 runs along the running route, running out of power is to be prevented until bus 2 returns to the departure place.

In the present embodiment, charging amount calculation apparatus 1 calculates an "amount of power consumption Wh1." Amount of power consumption Wh1 refers to an amount of electric power consumed by the battery for running along the running route. Charging amount calculation apparatus 1 calculates a "during-running charging amount Wh2." During-running charging amount Wh2 refers to an amount of power received by power reception apparatus 22 of bus 2 from the second power feeding facility (power feeding facilities 8 to 10). Then, charging amount calculation apparatus 1 calculates a "pre-running charging amount Wh3" based on the calculated "amount of power consumption Wh1" and "during-running charging amount Wh2."

At time t0, bus 2 is connected to contact type power feeding facility 7 at the departure place. The SOC at time t0 (which is referred to as a "pre-charging SOC") is the SOC before charging before running. Power feeding facility 7 charges bus 2 with electric power by calculated pre-running charging amount Wh3 during a period from t1 to t2. The SOC after charging is also referred to as a "post-charging SOC." In that state, bus 2 starts running along the running route at t3.

During a period until t18 when the bus returns, charging is carried out at P1 to P7. Specifically, a period from t4 to t5 (P1), a period from t6 to t7 (P2), a period from t8 to t9 (P3), a period from t10 to t11 (P4), a period from t12 to t13 (P5), a period from t14 to t15 (P6), and a period from t16 to t17 (P7) are periods of charging during running. The total of amounts of charging during these periods is calculated as "during-running charging amount Wh2." During-running charging amount Wh2 is larger as a stoppage time at bus stops A 51 to D 54 is longer.

For a period during running along the running route other than the period above, battery power is consumed, and electric power is consumed by "amount of power consumption Wh1." Amount of power consumption Wh1 is varied depending on the travel distance or the loaded weight of bus 2.

Pre-running charging amount Wh3 is calculated in an expression (A) below.

Pre-Running Charging Amount Wh3=(Lowest SOC−Pre-Charging SOC)+(Amount of Power Consumption Wh1−During-Running Charging Amount Wh2)    (A)

The lowest SOC means an SOC minimum necessary to such an extent that power is not run out. Since amount of power consumption Wh1 and during-running charging amount Wh2 are solely predicted values, the lowest SOC is set with a slight margin to such an extent that power is not run out even when these values are varied.

As illustrated, pre-running charging is carried out in such a manner that, after pre-running charging is carried out, the SOC lowers by amount of power consumption Wh1 and increases by during-running charging amount Wh2, with the lowest SOC finally being left.

Relation between the amount of power consumption and the during-running charging amount of bus 2 will now be described. While bus 2 is traveling along the running route, power in battery 21 is consumed and the SOC is lowered. An amount of lowering in this case is varied depending on the first information (the travel distance, the loaded weight, the outdoor air temperature, time of day, the season, or congestion information) stored in calculation information DB 13.

When bus 2 is being charged along the running route, the SOC increases. An amount of increase in this case is varied depending on the second information (the stoppage time or the time period of charging while traveling) stored in calculation information DB 13.

The travel distance refers to a total travel distance of bus 2 along the running route. The loaded weight refers to a loaded weight of bus 2 including a weight of a passenger who is on board bus 2. The loaded weight may be calculated as the average number of boardings on the running route×an average weight (for example, 65 kg)+a weight of other loaded objects. The loaded weight is varied by incoming and outgoing passengers in and out of bus 2 at at least one stop point (four bus stops in the present embodiment). There may be a single bus stop.

The outdoor air temperature is an outdoor air temperature while bus 2 runs along the running route. The season refers to a season of running of bus 2 along the running route (spring, summer, autumn, and winter). The congestion information is a condition of congestion (information such as "a section from bus stop A 51 to bus stop B 52 being congested") on the running route while bus 2 runs along the running route.

The stoppage time refers to a total of durations for which the bus stops at bus stop 51 A to bus stop 54 D (P1, P3, P5, and P7). Specifically, a total value of the period from t4 to t (P1), the period from t8 to t9 (P3), the period from t12 to t13 (P5), and the period from t16 to t17 (P7) corresponds to the stoppage time. The stoppage time is varied depending on the number of incoming and outgoing passengers at bus stop 51 A to bus stop 54 D.

The time period of charging while traveling refers to a time period of charging of bus 2 during travel along the running route by at least one second power feeding facility 9. Specifically, the time period of charging while traveling is a total of time periods when the bus travels over the charging lane (P2 and P6) in second power feeding facility 9. The total value of the period from t6 to t7 (P2) and the period from t14 to t15 (P6) corresponds to the time period of charging while traveling. The second information includes also the charging time period (t10 to t11) at P4. There may be a single second power feeding facility 9 on the running route.

Figure 5:
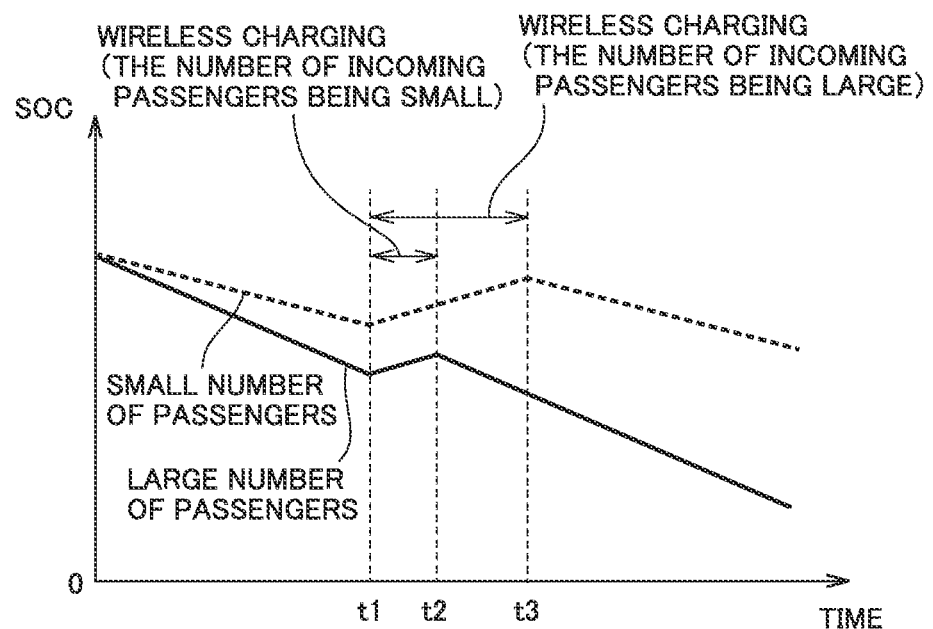
FIG. 5 is a diagram for illustrating relation between an amount of power consumption and a during-running charging amount of the bus according to the first embodiment.

FIG. 5 is a diagram for illustrating relation between the amount of power consumption and the during-running charging amount of bus 2 according to the first embodiment. The abscissa represents elapsed time and the ordinate represents the SOC of battery 21.

For example, an amount of consumption of power of battery 21 is larger when there are a large number of passengers on bus 2 (the loaded weight is large) (a solid line) than when there are a small number of passengers on bus 2 (the loaded weight is small) (a dotted line). Therefore, as shown at time before t1 or time after t3, a rate of lowering in SOC is high. As described above, the loaded weight can be calculated from the number of incoming and outgoing passengers.

It takes longer time for boarding when there is a large number of boardings on bus 2 at the bus stop (a dotted line from t1 to t3) than where there is a small number of boardings (a dotted line from t1 to t2). Therefore, a time period of charging to bus 2 is longer, and hence an amount of increase in SOC is larger in the former than in the latter.

An amount of lowering in SOC is larger as the travel distance is longer. When an air-conditioner is activated in bus 2, the amount of lowering in SOC is larger as a difference between a temperature in bus 2 and the outdoor air temperature is larger. The amount of lowering in SOC is larger at time of day when people go to work and come home than other times of day because of congestion on the running route.

The amount of lowering in SOC is larger in the winter or the summer among the seasons than in other seasons, because electric power consumed by the air-conditioner is higher. The amount of lowering in SOC is larger at a place where there is traffic congestion than a place where there is no traffic congestion. The amount of increase in SOC is larger as the charging lane is longer, because the time period of charging while traveling is longer.

Amount of power consumption Wh1 is calculated based on the first information (the travel distance, the loaded weight, the outdoor air temperature, time of day, the season, or the congestion information). During-running charging amount Wh2 is calculated based on the second information (the stoppage time or the time period of charging while traveling).

Amount of power consumption Wh1 and the first information correlate with each other as described above. During-running charging amount Wh2 and the second information con-elate with each other as described above. For example, relation between during-running charging amount Wh2 and the first information (or relation between amount of power consumption Wh1 and the second information) may be formulated in advance based on an actually measured value or a map of correspondence may be created, and then during-running charging amount Wh2 and amount of power consumption Wh1 should only be calculated based thereon.

<Control Flow>

Figure 6:
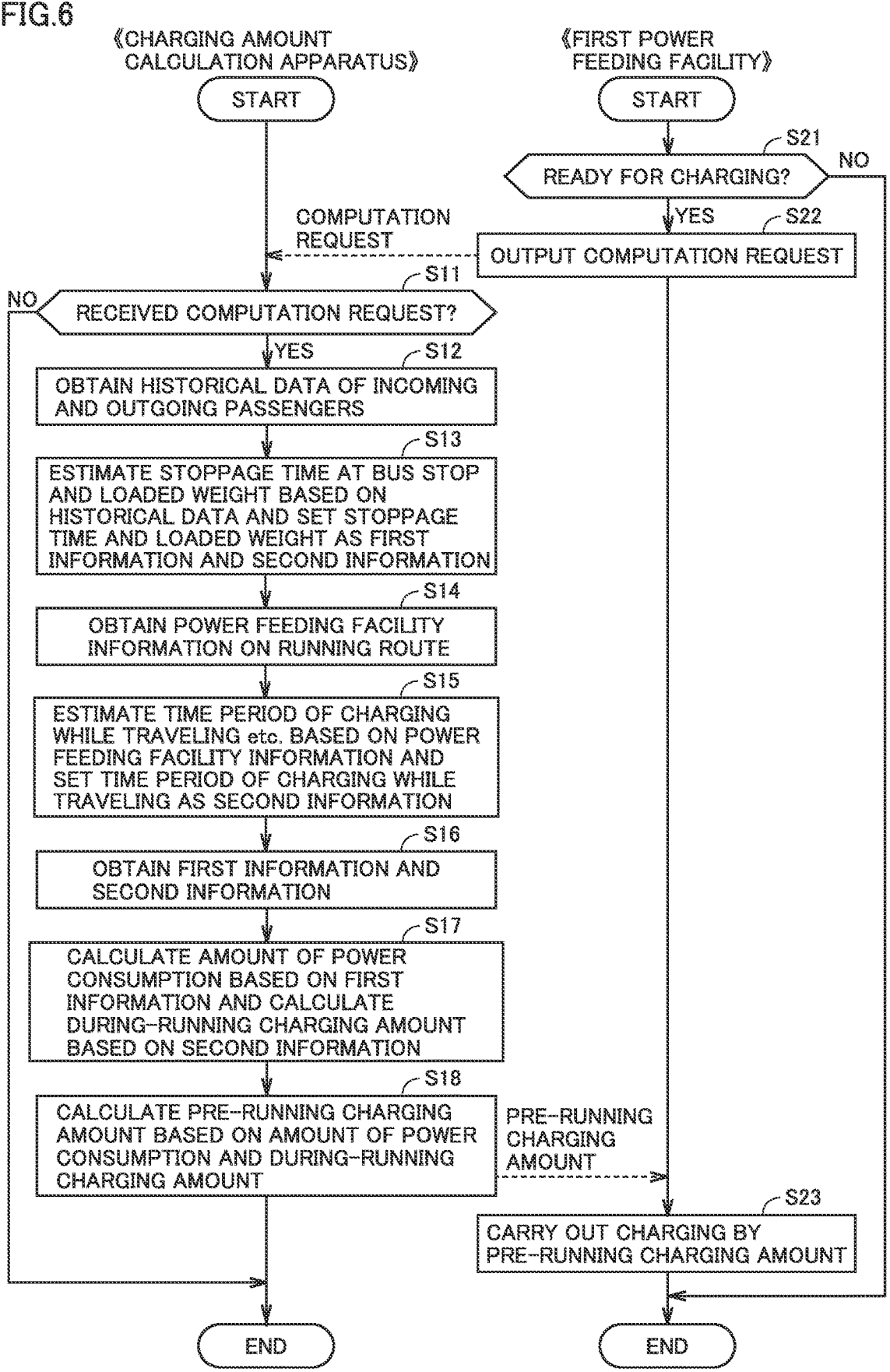
FIG. 6 is a flowchart showing a processing procedure in processing for charging the bus according to the first embodiment.

FIG. 6 is a flowchart showing a processing procedure in processing for charging bus 2 according to the first embodiment. This flowchart is performed, for example, by being invoked from a main routine (not shown) when a predetermined condition is satisfied. In the figure, processing performed by charging amount calculation apparatus 1 (processor 11) is shown on the left and processing performed by first power feeding facility 7 is shown on the right. Though each step is performed by software processing by charging amount calculation apparatus 1 or first power feeding facility 7, it may be performed by hardware such as a large scale integration (LSI) arranged in charging amount calculation apparatus 1 or ECU 26. The step will be abbreviated as S below.

In S21, first power feeding facility 7 determines whether or not preparation for contact charging has been completed. First power feeding facility 7 can determine that preparation for contact charging has been completed when bus 2 and first power feeding facility 7 are connected to each other through the charging cable (not shown). When preparation for contact charging has not been completed (NO in S21), first power feeding facility 7 has the process return to the main routine without performing subsequent processing. When preparation for contact charging has been completed (YES in S21), first power feeding facility 7 outputs a computation request for an amount of electric power to charging amount calculation apparatus 1 (S22).

In S11, charging amount calculation apparatus 1 determines whether or not it has received the computation request from first power feeding facility 7. When charging amount calculation apparatus 1 has not received the computation request (NO in S11), charging amount calculation apparatus 1 has the process return to the main routine. When charging amount calculation apparatus 1 has received the computation request (YES in S11), charging amount calculation apparatus 1 has the process proceed to S12.

In S12, charging amount calculation apparatus 1 obtains historical data on the number of incoming and outgoing passengers of bus 2 stored in running history database 14. For example, the charging amount calculation apparatus obtains historical data of the same running route (bus stops A to D) and at the same time of the day on the same day of the week (for example, time to go to work on Friday) from running history database 14. For example, for running via bus stops A to D at the time of day to go to work on Friday, the charging amount calculation apparatus obtains the number of boardings and the number of dismounts at bus stops A to D at the time of day to go to work on Friday in the previous week.

In S13, charging amount calculation apparatus 1 estimates the stoppage time at the bus stop and the loaded weight based on the historical data and sets them as the first information and the second information. For example, it is assumed that the number of boardings was X1 and the number of dismounts was Y1 (0) at bus stop 1 at the time of day to go to work in the previous week (see FIG. 1).

A time period required for one passenger to get on or off the bus is assumed as K. The time period for getting on the bus is calculated as X1×K and the time period for getting off the bus is calculated as Y1×K. Then, a longer time period of them is estimated as the stoppage time at bus stop A.

Since there is no passenger until bus stop A, the number of passengers on bus 2 is 0. The number of passengers between bus stops A and B is X1. The loaded weight of bus 2 is calculated as the number of passengers×M1+M2, where M1 represents the loaded weight of bus 2 other than the passenger (a driver or bags) and M2 represents a weight (for example, 65 kg) per one passenger. The loaded weight until bus stop A is calculated as M2 and the loaded weight between bus stops A and B is calculated as X1×M1+M2.

Similarly hereinafter, the stoppage time at bus stops B, C. and D and the loaded weight in the sections between bus stops B and C, between bus stops C and D, and after bus stop D can be calculated. A value calculated by summing the stoppage times is calculated as the "stoppage time." An average value of the loaded weights is calculated as the "loaded weight." The calculated stoppage time and loaded weight are set as the second information.

In S14, charging amount calculation apparatus 1 obtains information on the power feeding facility on the running route. Specifically, the charging amount calculation apparatus obtains a length of the charging lane at points P2 and P6 in FIG. 3. The charging amount calculation apparatus obtains a time period during which charging can be carried out at P4.

In S15, charging amount calculation apparatus 1 estimates the time period of charging while traveling based on the information on the power feeding facility and sets it as the second information. The charging amount calculation apparatus calculates the length of the charging lanes at points P2 and P6×an average traveling speed of bus 2 as the time period of charging while traveling and sets it as the second information. The charging amount calculation apparatus sets also a time period during which charging can be carried out at P4 as the second information.

In S16, charging amount calculation apparatus 1 obtains the first information and the second information. As described above, the first information includes the travel distance, the loaded weight, the outdoor air temperature, time of day, the season, and the congestion information. The second information includes the stoppage time and the time period of charging while traveling.

In S17, charging amount calculation apparatus 1 calculates amount of power consumption Wh1 based on the first information and calculates during-running charging amount Wh2 based on the second information. The calculation method is as described above.

In S18, charging amount calculation apparatus 1 calculates pre-running charging amount Wh3 based on amount of power consumption Wh1 and during-running charging amount Wh2. Pre-running charging amount Wh3 is calculated in the expression (A) described above. The calculated pre-running charging amount is transmitted to first power feeding facility 7. After S18, the process returns to the main routine.

In S23, first power feeding facility 7 carries out contact charging of bus 2 such that bus 2 is charged by the pre-running charging amount calculated in S18. First power feeding facility 7 thus quits a series of processing and has the process return to the main routine. When contact charging is completed and the departure time comes, bus 2 starts running along the running route.

As set forth above, in the first embodiment, charging amount calculation apparatus 1 calculates amount of power consumption Wh1 consumed by battery 21 for running along the running route and during-running charging amount Wh2 received by the power reception apparatus from at least one second power feeding facility 8 to 10. Charging amount calculation apparatus 1 calculates amount of power consumption Wh1 based on the first information. Charging amount calculation apparatus 1 calculates during-running charging amount Wh2 based on the second information. Charging amount calculation apparatus 1 calculates pre-running charging amount Wh3 based on amount of power consumption Wh1 and during-running charging amount Wh2. First power feeding facility 7 charges bus 2 with electric power by pre-running charging amount Wh3 calculated by charging amount calculation apparatus 1.

When power feeding facilities 8 are insufficient at the departure place such as a business facility, bus 2 cannot appropriately be charged before running and power may run out during running. Since charging by an amount of charging based on the amount of charging during running and the amount of power consumption can be carried out in consideration of a factor (the loaded weight or the like) affecting the amount of power consumption and a factor (the stoppage time or the like) affecting the during-running charging amount as described above, charging more than necessary is not carried out. By not carrying out charging more than necessary, the charging time period before running can accordingly be reduced. Then, the reduced charging time period can be allocated as the charging time period for another bus 2, and hence such a situation that power runs out during running can be avoided. Bus 2 can thus suitably be charged before running along the running route.

Running history database 14 obtains information on the number of incoming and outgoing passengers from bus 2 and the information is accumulated therein as the historical data. Charging amount calculation apparatus 1 estimates the stoppage time and the loaded weight based on the accumulated historical data in the past. Therefore, accuracy in estimation of the amount of power consumption can further be enhanced.

Though charging amount calculation apparatus 1 calculates the amount of charging in the first embodiment, without being limited as such, first power feeding facility 7 may be configured to calculate the amount of charging. Though wireless charging and contact charging are carried out on the running route, without being limited as such, only wireless charging may be carried out or only contact charging may be carried out. Power may be fed or may not be fed at a bus stop. The stoppage time of bus 2 may be calculated from position information of bus 2 obtained by the GPS. In this case, a time period for which bus 2 stays at the bus stop is defined as the stoppage time.

In calculating amount of power consumption Wh1, it may be calculated also in consideration of a gradient (ascent and descent) of a slope on the running route, other than the travel distance and the loaded weight in connection with the running route A scene in which bus 2 includes a sterilization system (a UV system) for prevention of infectious diseases and sterilization by ultraviolet rays is also assumed. In this case, a frequency of sterilization should only be determined in accordance with the number of boardings on bus 2 (or a measured concentration of carbon dioxide). When the sterilization system is applied, the amount of power consumption necessary for sterilization should only be determined based on the number of boardings.

Second Embodiment

<System Configuration>

In the first embodiment, bus 2 is exemplified as the vehicle and charging system 100 that charges bus 2 is described. In contrast, in a second embodiment, a delivery vehicle 3 is exemplified as the vehicle and charging system 100 that charges delivery vehicle 3 will be described. Delivery vehicle 3 is a vehicle that delivers a delivery item on the running route. In the second embodiment, differences from the first embodiment will be described and description of redundant features will not be provided.

Figure 7:
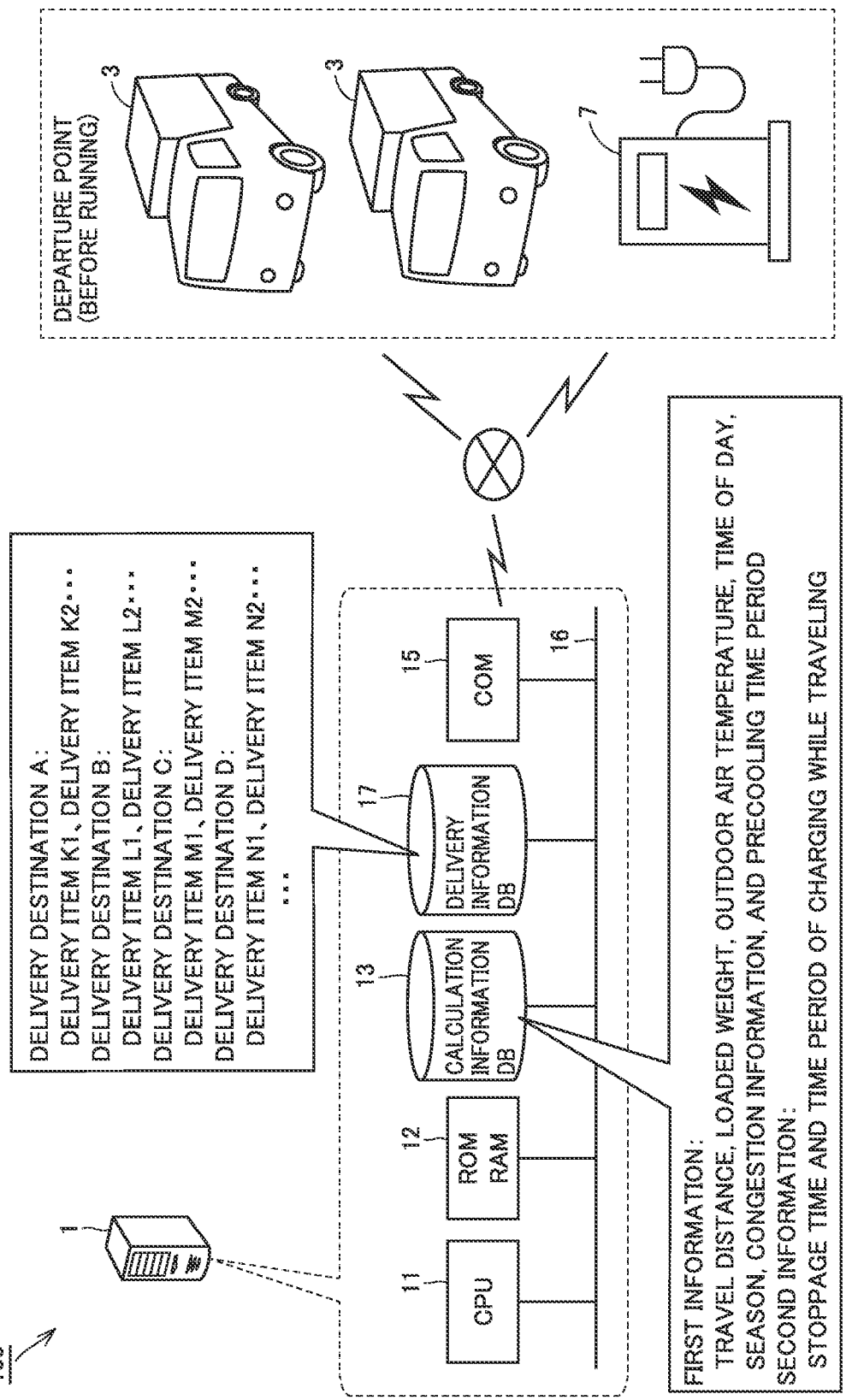
FIG. 7 is a diagram schematically showing an overall configuration of a delivery vehicle charging system according to a second embodiment.

FIG. 7 is a diagram schematically showing an overall configuration of charging system 100 that charges delivery vehicle 3 according to the second embodiment. Charging system 100 includes charging amount calculation apparatus 1 and first power feeding facility 7. First power feeding facility 7 charges a plurality of delivery vehicles 3.

Charging amount calculation apparatus 1 is a server apparatus. Charging amount calculation apparatus 1 includes processor 11, memory 12, calculation information database 13, a delivery information database 17, communication module 15, and data line 16.

In the second embodiment, charging amount calculation apparatus 1 includes delivery information database 17 instead of running history database 14. Information on a delivery destination to which delivery vehicle 3 attempts delivery is recorded in delivery information database 17.

For example, such information that delivery items K1 and K2 are delivered to a delivery destination A, delivery items L1 and L2 are delivered to a delivery destination B, delivery items M1 and M2 are delivered to a delivery destination C, and delivery items N1 and N2 are delivered to a delivery destination D is recorded. When there is a delivery item to be picked up from a delivery destination, that information is also recorded and information on a size or a weight of the delivery item is also recorded. A time period that seems to be required for loading and unloading of the delivery item at the delivery destination (stop time) and information necessary for calculating the loaded weight including a weight of the delivery item are recorded in delivery information database 17.

Charging amount calculation apparatus 1 calculates the pre-running charging amount for charging of delivery vehicle 3 before running along the running route. First power feeding facility 7 charges delivery vehicle 3 with electric power by the pre-running charging amount calculated by charging amount calculation apparatus 1.

Figure 8:
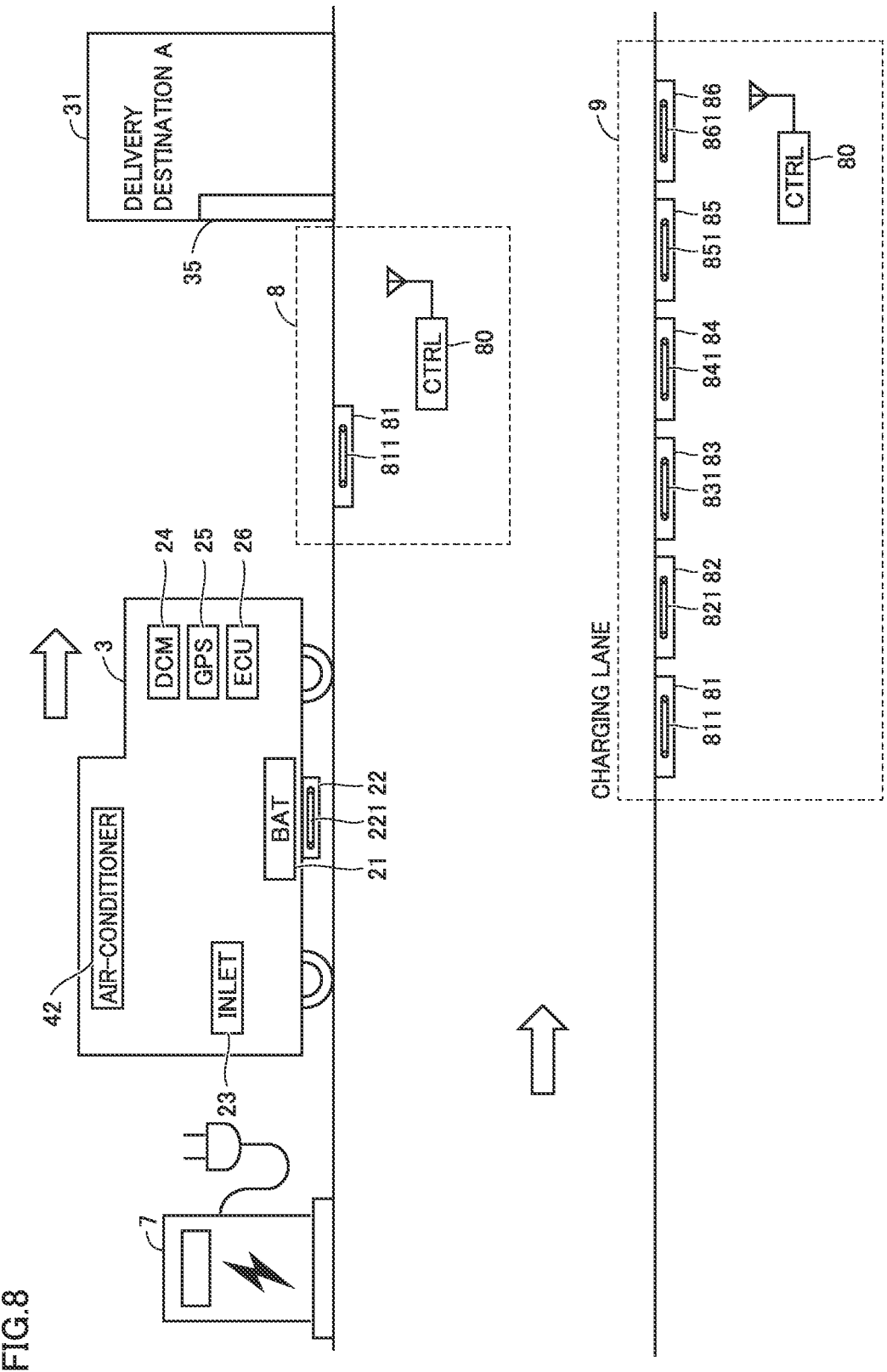
FIG. 8 is a diagram schematically showing an exemplary configuration of a delivery vehicle and a power feeding facility according to the second embodiment.

The first information and the second information are stored in calculation information database 13 as various types of information for calculating the pre-running charging amount. Though present contents are substantially the same as in the first embodiment, in the second embodiment, a "precooling time period" is included. Delivery vehicle 3 carries some of delivery items to be delivered to delivery destinations with their temperature being kept at a prescribed temperature or lower. Therefore, a partial space in delivery vehicle 3 is cooled by an air-conditioner 42 (FIG. 8). In order to set the partial space in delivery vehicle 3 to a temperature equal to or lower than the prescribed temperature, air-conditioner 42 should be activated before delivery. A time period for which air-conditioner 42 is activated before delivery (a time period for cooling in advance of the inside of delivery vehicle 3 before running) is referred to as a "precooling time period."

<Contact and Wireless Electric Power Transmission>

FIG. 8 is a diagram schematically showing an exemplary configuration of delivery vehicle 3 and power feeding facilities 7 to 9 according to the second embodiment. Delivery vehicle 3 includes battery 21, power reception apparatus 22, inlet 23, DCM 24, GPS receiver 25, ECU 26, and air-conditioner 42. Air-conditioner 42 is as described previously and the configuration is otherwise the same as in the first embodiment.

Functions of power feeding facilities 7 to 9 are the same as in the first embodiment. Power feeding facility 8, however, is provided around a service entrance of the delivery destination. The present example exemplifies a delivery destination A 31.

Delivery destination A 31 includes service entrance 35, and delivery items are loaded and unloaded through service entrance 35. In loading and unloading of delivery items at delivery destination A, delivery vehicle 3 is parked at a position where it can receive electric power from power feeding facility 8.

Power feeding facility 8 includes single power transmission unit 81 and controller 80. Though not shown, power transmission unit 81 is provided with a sensor (an optical sensor, a weight sensor, or the like) that detects presence of delivery vehicle 3 above power transmission unit 81.

Controller 80 has AC power from the AC power supply supplied to power transmission coil 811 in power transmission unit 81 based on the detection signal from the sensor. Power transmission unit 81 is arranged at a position where it can supply electric power to delivery vehicle 3 when delivery vehicle 3 is parked at a position around the service entrance at the delivery destination (delivery destination A 31 in the present example).

Thus, electric power can be supplied to delivery vehicle 3 while delivery vehicle 3 stops at the delivery destination. At that time, when there are many delivery items and it takes time for loading and unloading, a time period of charging of delivery vehicle 3 is longer.

<Running Route>

Figure 9:
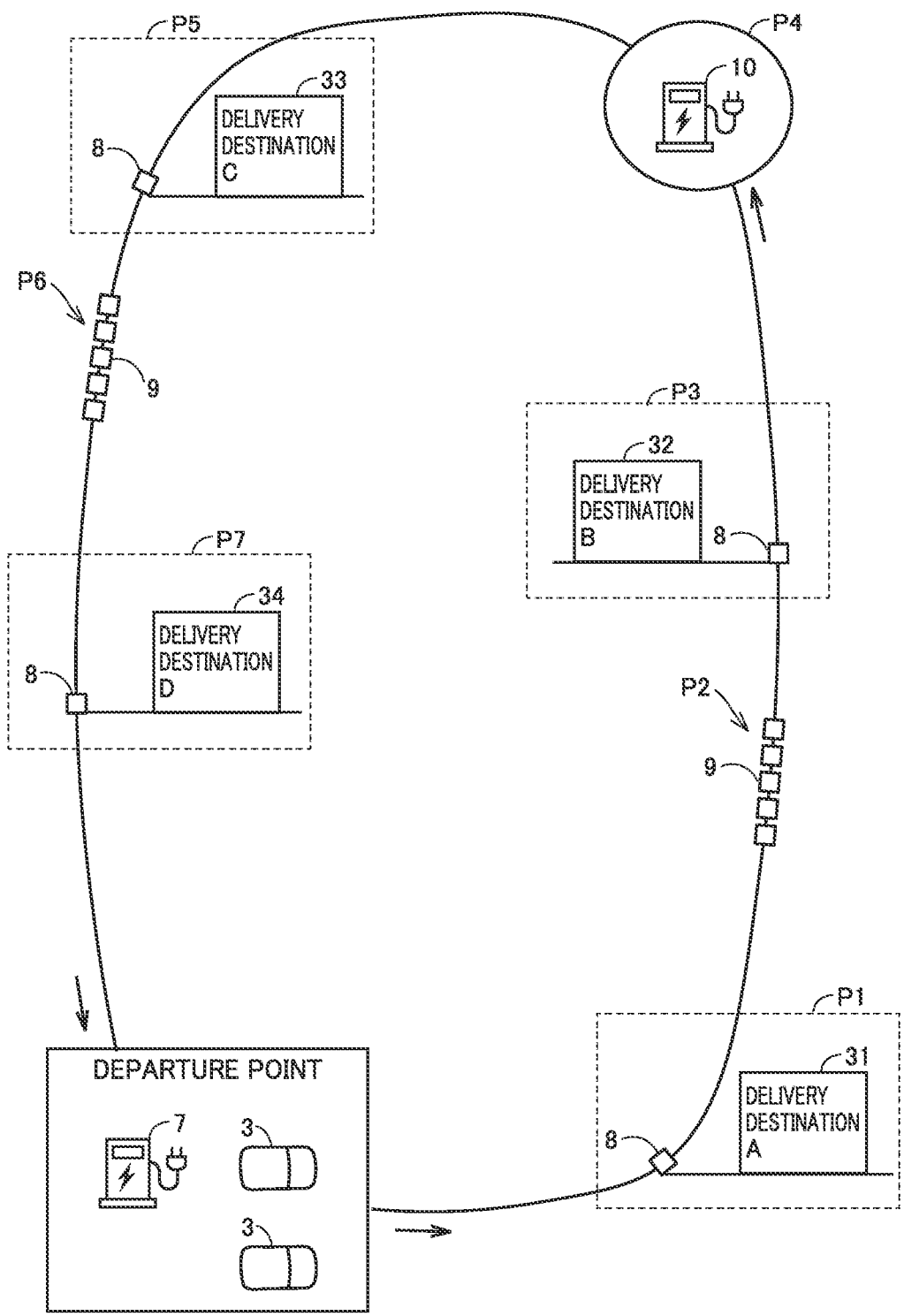
FIG. 9 is a diagram showing an exemplary running route of the delivery vehicle according to the second embodiment.

FIG. 9 is a diagram showing an exemplary running route of delivery vehicle 3 according to the second embodiment. There is at least one stop point on the running route. In the present embodiment, four delivery destinations A 31 to D 34 are defined as stop points. In this example, such a running route that delivery vehicle 3 leaves a departure point and returns to the departure point via delivery destinations A 31 to D 34 is assumed. Stop points where power feeding facilities 8 to 10 are placed on the running route are shown with points P1 to P7.

When delivery vehicle 3 starts running along the running route, initially, it heads for delivery destination A 31 (point P1) where power feeding facility 8 is placed. Then, the delivery vehicle heads for a delivery destination B 32 (point P3) where power feeding facility 8 is placed. On that path, there is a charging lane (point P2) where power feeding facility 9 is placed, so that the delivery vehicle can be charged during traveling over the charging lane.

After the delivery vehicle leaves delivery destination B 32 (point P3), before reaching a next delivery destination C 33 (point P5), power feeding facility 10 (point P4) is placed. Delivery vehicle 3 temporarily stops at point P4 for time adjustment. At that time, delivery vehicle 3 can carry out contact charging using power feeding facility 10.

After the delivery vehicle leaves delivery destination C 33 (point P5), before reaching next delivery destination D 34 (point P7), there is a charging lane (point P6) where power feeding facility 9 is placed, so that the delivery vehicle can be charged during traveling over the charging lane. The delivery vehicle leaves delivery destination D 54 (point P7) and returns to the departure point.

Since delivery vehicle 3 thus travels along the predetermined running route, it can be charged at points P1 to P7 placed on the running route.

Figure 10:
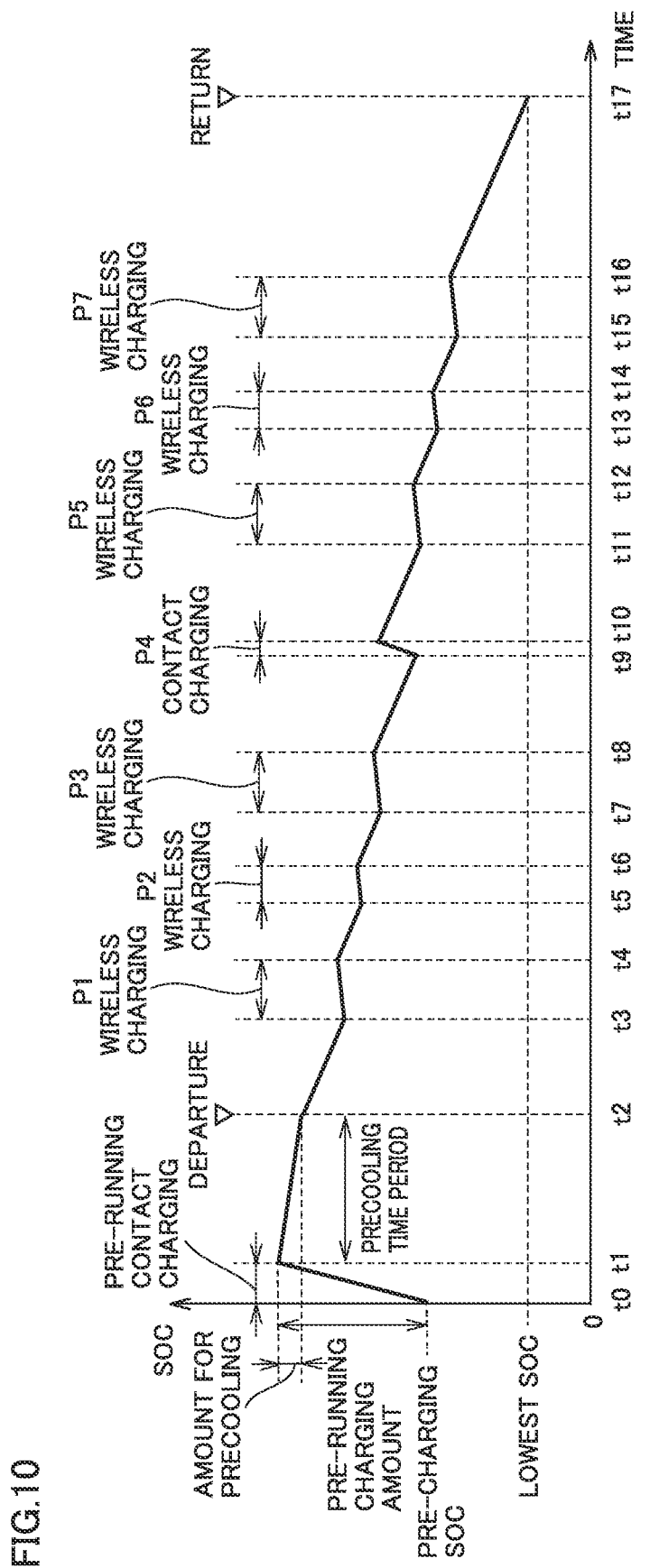
FIG. 10 is a diagram for illustrating transition of an amount of charging of the delivery vehicle according to the second embodiment.

FIG. 10 is a diagram for illustrating transition of the amount of charging of delivery vehicle 3 according to the second embodiment. The abscissa represents elapsed time and the ordinate represents the SOC of battery 21.

As described above, delivery vehicle 3 can be charged at points P1 to P7 from departure from the departure point until return to the departure point. When delivery vehicle 3 runs along the running route, running out of power is to be prevented until delivery vehicle 3 returns to the departure place.

The difference from the first embodiment resides in necessity for the "precooling time period" (t1 to t2) described above. In the first embodiment, the amount of power consumption on the running route from departure to return is calculated. In contrast, in the second embodiment, the amount of power consumption is calculated also in consideration of the amount of power consumption by precooling.

Specifically, amount of power consumption Wh1 inclusive of an amount of electric power ("amount for precooling" in the figure) consumed during the precooling time period (t1 to t2) is calculated. Since delivery vehicle 3 transports delivery items with a temperature of the delivery items being kept at a temperature equal to or lower than a prescribed temperature, the amount of power consumption increases by an amount for cooling by air-conditioner 42.

Since the first embodiment and the second embodiment are different from each other in interpretation of the loaded weight and the stoppage time, description will be given with reference to FIG. 11. The second embodiment is otherwise basically similar to the first embodiment, and pre-running charging amount Wh3 is calculated similarly in accordance with the expression (A).

Figure 11:
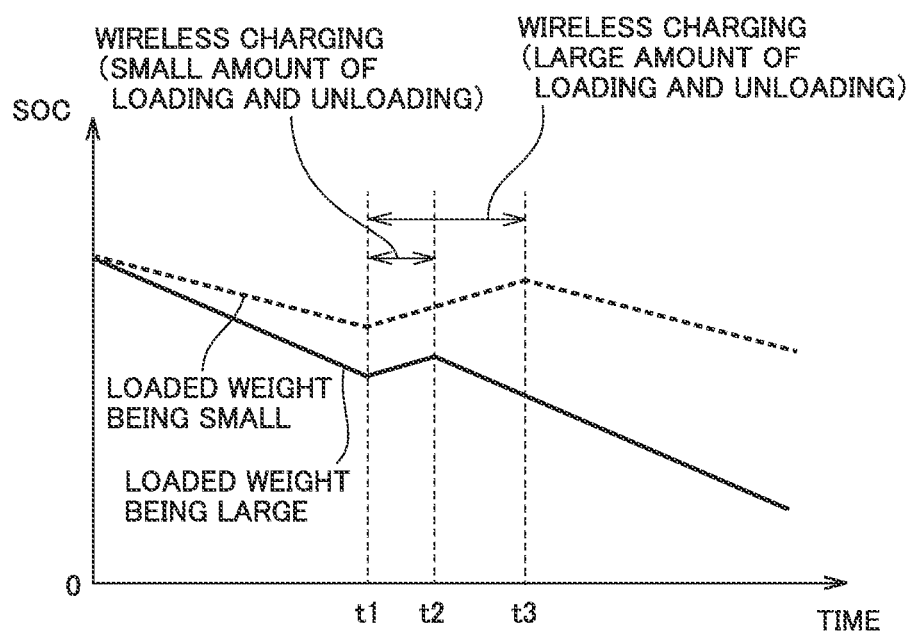
FIG. 11 is a diagram for illustrating relation between an amount of power consumption and a during-running charging amount of the delivery vehicle according to the second embodiment.

FIG. 11 is a diagram for illustrating relation between the amount of power consumption and the during-running charging amount of delivery vehicle 3 according to the second embodiment. The abscissa represents elapsed time and the ordinate represents the SOC of battery 21.

For example, the amount of consumption of power in battery 21 is larger when there are a large number of delivery items (the loaded weight is larger) in delivery vehicle 3 (a solid line) than when there are a small number of delivery items in delivery vehicle 3 (the loaded weight is smaller) (a dotted line). Therefore, as shown at time before t1 or time after t3, a rate of lowering in SOC is high. The loaded weight can be calculated from the weight of delivery items.

It takes longer time when there are a large number of delivery items loaded on and unloaded from delivery vehicle 3 at the delivery destination (a dotted line from t1 to t3) than where there are a small number of delivery items (a dotted line from t1 to t2). Therefore, a time period for charging to delivery vehicle 3 is longer, and hence an amount of increase in SOC is larger in the former than in the latter.

The loaded weight is thus varied by loading and unloading of delivery items on delivery vehicle 3 at at least one stop point (four delivery destinations in the present embodiment). The stoppage time is varied by the number of delivery items loaded and unloaded at at least one stop point (four delivery destinations).

FIG. 12 is a flowchart showing a processing procedure in processing for charging delivery vehicle 3 according to the second embodiment. This flowchart is performed, for example, by being invoked from a main routine (not shown) when a predetermined condition is satisfied. In the figure, processing performed by charging amount calculation apparatus 1 (processor 11) is shown on the left and processing performed by first power feeding facility 7 is shown on the right.

In S41, first power feeding facility 7 determines whether or not preparation for contact charging of delivery vehicle 3 has been completed. When preparation for contact charging has not been completed (NO in S41), first power feeding facility 7 has the process return to the main routine without performing subsequent processing. When preparation for contact charging has been completed (YES in S41), first power feeding facility 7 outputs a computation request for an amount of electric power to charging amount calculation apparatus 1 (S42).

In S31, charging amount calculation apparatus 1 determines whether or not it has received the computation request from first power feeding facility 7. When charging amount calculation apparatus 1 has not received the computation request (NO in S31), charging amount calculation apparatus 1 has the process return to the main routine. When charging amount calculation apparatus 1 has received the computation request (YES in S31), charging amount calculation apparatus 1 has the process proceed to S32.

In S32, charging amount calculation apparatus 1 obtains delivery schedule information of delivery vehicle 3 stored in delivery information database 17. How many delivery items are loaded and unloaded at each delivery destination can thus be known.

In S33, charging amount calculation apparatus 1 estimates the stoppage time at the delivery destination and the loaded weight based on the delivery schedule information and sets them as the second information. Charging amount calculation apparatus 1 estimates a time period for parking at the delivery destination for loading and unloading from an amount of loading and unloading of delivery items at each delivery destination. For example, it is assumed that the stoppage time is calculated as an average time period required for loading and unloading of one delivery item×the number of delivery items. The total time of parking at each delivery destination is defined as the "stoppage time" and set as the second information.

The loaded weight of delivery vehicle 3 in each section is calculated based on the weight of the delivery item loaded on delivery vehicle 3—the weight of the delivery item unloaded from the delivery vehicle at each delivery destination. An average value of the loaded weights of delivery vehicle 3 in each section is defined as the "loaded weight" and set as the first information.

In S34, charging amount calculation apparatus 1 obtains information on the power feeding facility on the running route. Specifically, the charging amount calculation apparatus obtains a length of the charging lane at points P2 and P6 in FIG. 3. The charging amount calculation apparatus obtains a time period during which charging can be carried out at P4.

In S35, charging amount calculation apparatus 1 estimates the time period of charging while traveling based on the information on the power feeding facility and sets it as the second information. The charging amount calculation apparatus calculates the length of the charging lanes at points P2 and P6×an average traveling speed of delivery vehicle 3 as the time period of charging while traveling and sets it as the second information. The charging amount calculation apparatus sets also a time period during which charging can be carried out at P4 as the second information.

In S36, charging amount calculation apparatus 1 obtains the first information and the second information. In S37, charging amount calculation apparatus 1 calculates amount of power consumption Wh1 based on the first information and calculates during-running charging amount Wh2 based on the second information.

In S38, charging amount calculation apparatus 1 calculates pre-running charging amount Wh3 based on amount of power consumption Wh1 and during-running charging amount Wh2. Pre-running charging amount Wh3 is calculated in the expression (A) described above. The calculated pre-running charging amount is transmitted to first power feeding facility 7. After S38, the process returns to the main routine.

In S43, first power feeding facility 7 carries out contact charging of delivery vehicle 3 such that delivery vehicle 3 is charged by the pre-running charging amount calculated in S38. First power feeding facility 7 thus quits a series of processing and has the process return to the main routine. After contact charging is completed, delivery vehicle 3 starts running along the running route.

As set forth above, in the second embodiment, charging amount calculation apparatus 1 calculates pre-running charging amount Wh3 based on amount of power consumption Wh1 and during-running charging amount Wh2. First power feeding facility 7 charges delivery vehicle 3 with electric power by pre-running charging amount Wh3 calculated by charging amount calculation apparatus 1.

When power feeding facilities 7 are insufficient at the departure place such as a business facility, delivery vehicle 3 cannot appropriately be charged before running and power may run out during running. Since charging by an amount of charging based on the amount of charging during running and the amount of power consumption can be carried out in consideration of a factor (the loaded weight or the like) affecting the amount of power consumption and a factor (the stoppage time or the like) affecting the during-running charging amount as described above, charging more than necessary is not carried out. By not carrying out charging more than necessary, the charging time period before running can accordingly be reduced. Then, the reduced charging time period can be allocated as the charging time period for another delivery vehicle 3, and hence such a situation that power runs out during running can be avoided. Delivery vehicle 3 can thus suitably be charged before running along the running route.

The delivery schedule information in which information on the delivery item delivered on the running route is recorded is stored in delivery information database 17. Since charging amount calculation apparatus 1 estimates the stoppage time and the loaded weight based on the delivery schedule information, accuracy in estimation of the amount of power consumption can further be enhanced.

In the second embodiment, charging may or may not be carried out at the delivery destination. When charging is carried out at the delivery destination, charging may be carried out by either wireless charging or contact charging. The delivery destination may be a factory or the like owned by an incorporated organization, an apartment house rented by an individual (charging from an apartment facility), a school, a hospital, or any entity.

In charging by power feeding facility 8 at the delivery destination, at the time of charging, delivery vehicle 3 and power feeding facility 8 may communicate with each other with charging amount calculation apparatus 1 being interposed, so that processing for authenticating delivery vehicle 3 is performed. For example, it is assumed that an ID of delivery vehicle 3 has been registered in advance in the delivery destination. When power feeding facility 8 is connected to delivery vehicle 3 to communicate therewith, it receives the ID from delivery vehicle 3 to perform authentication processing. When the ID of delivery vehicle 3 has been registered in advance, the power feeding facility may permit charging to delivery vehicle 3. Charging may freely be carried out without such authentication processing.

The second embodiment is configured such that delivery items on delivery vehicle 3 should be kept at a temperature equal to or lower than a prescribed temperature and precooling is carried out. In this case, a person in charge at the delivery destination may be absent and the delivery item may be taken back. In this case, the inside of delivery vehicle 3 should be kept at the prescribed temperature until delivery vehicle 3 returns to the departure place and the delivery item is stored at another location (until prescribed time after return). In this case, amount of power consumption Wh1 inclusive also of electric power for cooling until the prescribed time after return, in addition to the precooling time period, is calculated.

Amount of power consumption Wh1 may be calculated also in consideration of escape of cold air due to opening and closing of the door of delivery vehicle 3 at the time of loading and unloading. Thus, in particular when delivery vehicle 3 is used for a delivery service such as a cooled delivery service, advance charging should be carried out also in consideration of cooling of the inside of delivery vehicle 3 as above. At that time, the amount of charging is determined particularly in consideration of such information as weather (fine), time of day (time of day when the air temperature is high), the season (the summer or the winter), or the outdoor air temperature (information on necessity for electric power for cooling).

When charging can be carried out at the delivery destination, pre-running charging amount Wh3 may be calculated on the premise that electric power necessary for maintaining the temperature in a refrigerator during parking at the delivery destination can be provided at the delivery destination. In this case, pre-running charging amount Wh3 is calculated, with charging and consumption of electric power while parking at the delivery destination being excluded and in consideration only of other charging and consumption of electric power. By thus simplifying processing, generation of a plan for running can be facilitated.

When delivery vehicle 3 includes a sterilization system, bacteria and germs carried at the time of loading and unloading of delivery items are eliminated. Therefore, when the sterilization system is applied, amount of power consumption Wh1 necessary for sterilization should only be determined based on the number of times of loading and unloading of delivery items. The matters disclosed in the first embodiment and the matters disclosed in the second embodiment described above may freely be combined, inclusive of modifications.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A charging amount calculation apparatus that calculates a pre-running charging amount for charging of a vehicle before traveling along a running route, the charging amount calculation apparatus comprising:
    a processor; and
    a memory in which a program executable by the processor is stored, wherein
    the vehicle includes
        a power reception apparatus configured to receive electric power from a power feeding facility, and
        a battery for traveling in which electric power received by the power reception apparatus is stored,
    the power feeding facility includes
        a first power feeding facility that charges the vehicle before traveling along the running route, and
        at least one second power feeding facility that charges the vehicle as the vehicle travels along the running route,
    each of the first power feeding facility and the at least one second power feeding facility is configured to transmit electric power by one of first power transmission in which electric power is transmitted through a charging cable and second power transmission in which electric power is wirelessly transmitted,
    the power reception apparatus is configured to receive electric power through at least one of the first power transmission and the second power transmission, and
    the processor
        calculates an amount of power consumption by the battery for traveling along the running route and a during-running charging amount received by the power reception apparatus from the at least one second power feeding facility, and
        calculates the pre-running charging amount based on the amount of power consumption and the during-running charging amount.

2. The charging amount calculation apparatus according to claim 1,
    wherein the processor
        calculates the amount of power consumption based on first information, and
        calculates the during-running charging amount based on second information,
    the at least one second power feeding facility is provided at at least one stop point on the running route,
    the first information includes a travel distance along the running route and a loaded weight of the vehicle, and
    the second information includes a stoppage time of the vehicle at the at least one stop point.

3. The charging amount calculation apparatus according to claim 2, wherein
    the first information further includes at least one of an outdoor air temperature, time of day, a season, and congestion information along the running route and a precooling time period for cooling an inside of the vehicle before the vehicle travels along the running route,
    the vehicle can be charged during travel along the running route by the at least one second power feeding facility,
    the second information further includes a time period of charging while traveling, and
    the time period of charging while traveling is a time period for charging of the vehicle during traveling along the running route by the at least one second power feeding facility.

4. The charging amount calculation apparatus according to claim 2, wherein
    the vehicle is a bus that transports a passenger,
    the memory obtains information on the number of incoming and outgoing passengers from the vehicle, and the information is accumulated in the memory as historical data, and
    the processor estimates the stoppage time and the loaded weight based on the historical data.

5. The charging amount calculation apparatus according to claim 2, wherein
    the vehicle is a delivery vehicle that delivers a delivery item,
    delivery schedule information in which information on the delivery item delivered on the running route is recorded is stored in the memory, and
    the processor estimates the stoppage time and the loaded weight based on the delivery schedule information.

6. A charging system comprising:
    a charging amount calculation apparatus that calculates a pre-running charging amount for charging of a vehicle before running along a running route;
    a first power feeding facility that charges the vehicle before running along the running route; and
    at least one second power feeding facility for charging the vehicle as the vehicle travels along the running route, wherein
    the vehicle includes
        a power reception apparatus configured to receive electric power from the first power feeding facility or the at least one second power feeding facility, and
        a battery for traveling in which electric power received by the power reception apparatus is stored,
    each of the first power feeding facility and the at least one second power feeding facility is configured to transmit electric power through one of first power transmission in which electric power is transmitted through a charging cable and second power transmission in which electric power is wirelessly transmitted,
    the power reception apparatus is configured to receive electric power through at least one of the first power transmission and the second power transmission,
    the charging amount calculation apparatus
        calculates an amount of power consumption by the battery for traveling along the running route and a during-running charging amount received by the power reception apparatus from the at least one second power feeding facility, and calculates the pre-running charging amount based on the amount of power consumption and the during-running charging amount, and the first power feeding facility charges the vehicle with electric power by the pre-running charging amount calculated by the charging amount calculation apparatus.

* * * * *